(12) United States Patent
Hoot et al.

(10) Patent No.: US 7,639,675 B1
(45) Date of Patent: *Dec. 29, 2009

(54) ETHERNET AUTOMATIC MEDIA SELECTION LOGIC

(75) Inventors: Daryl Hoot, Mountain View, CA (US); William Lo, Cupertino, CA (US)

(73) Assignee: Marvell International Ltd, Hamilton (BM)

(*) Notice: Subject to any disclaimer, the term of this patent is extended or adjusted under 35 U.S.C. 154(b) by 477 days.

This patent is subject to a terminal disclaimer.

(21) Appl. No.: 11/400,457

(22) Filed: Apr. 7, 2006

Related U.S. Application Data

(63) Continuation of application No. 09/991,046, filed on Nov. 21, 2001, now Pat. No. 7,054,309.

(51) Int. Cl.
*H04L 12/50* (2006.01)
*H04J 3/16* (2006.01)

(52) U.S. Cl. .............. 370/360; 370/384; 370/469

(58) Field of Classification Search ......... 370/357–360, 370/384, 386, 465, 469, 252, 241; 709/209, 709/222, 228
See application file for complete search history.

(56) References Cited

U.S. PATENT DOCUMENTS

| | | | |
|---|---|---|---|
| 5,610,903 A | 3/1997 | Crayford | |
| 5,737,108 A | 4/1998 | Bunch et al. | |
| 5,922,052 A * | 7/1999 | Heaton | 709/223 |
| 6,072,803 A | 6/2000 | Allmond et al. | |
| 6,073,006 A | 6/2000 | Sawyer et al. | |
| 6,215,816 B1 | 4/2001 | Gillespie et al. | |
| 6,259,745 B1 | 7/2001 | Chan | |
| 6,272,173 B1 | 8/2001 | Hatamian | |
| 6,275,501 B1 | 8/2001 | Lucas et al. | |
| 6,285,659 B1 | 9/2001 | Faeuerstraeter et al. | |
| 6,385,738 B1 * | 5/2002 | Lo | 714/25 |
| 6,389,005 B1 | 5/2002 | Cruickshank | |
| 7,012,897 B1 | 3/2006 | Sowizral et al. | |
| 2003/0035410 A1 | 2/2003 | Laroia et al. | |
| 2003/0179709 A1 | 9/2003 | Huff | |
| 2004/0022238 A1 | 2/2004 | Kimmitt | 370/366 |

FOREIGN PATENT DOCUMENTS

EP    0 986 217 A2    3/2000

OTHER PUBLICATIONS

IEEE Stadard 802.3, Local and Metropolitan Area Networks: Physical Layer Link Signaling for 10 Mb/s, and 1000 Mb/s Auto-Negotiation on Twisted Pair, 2000 Edition, pp. 698-745; and pp. 1009-1033.
IEEE Standard 802.3 Edition, Local and Metropolitan Area Networks: Sections 28-38, pp. 698-1033.

* cited by examiner

*Primary Examiner*—Ronald Abelson

(57) ABSTRACT

A network device includes a media access controller (MAC) and a physical layer having an interface that communicates with the MAC. A first autonegotiation circuit attempts to establish a link using a first transceiver over a first media. A second autonegotiation circuit attempts to establish a link using a second transceiver over a second media. A media selector communicates with the interface and the first and second autonegotiation circuits. The media selector enables data flow from the first media to the MAC using the interface when a link is established first over the first media. The media selector enables data flow from the second media to the MAC using the interface when a link is established first over the second media.

32 Claims, 4 Drawing Sheets

ETHERNET AUTOMATIC MEDIA SELECTION LOGIC

CROSS-REFERENCE TO RELATED APPLICATIONS

This application is a continuation of U.S. patent application Ser. No. 09/991,046 filed on Nov. 21, 2001. The disclosure of the above application is incorporated herein by reference.

FIELD OF THE INVENTION

The present invention relates to computer networks, and more particularly to an automatic media selector for Ethernet networks.

BACKGROUND OF THE INVENTION

Referring now to FIG. 1, a data link layer 10 of the open systems interconnection (OSI) model includes a logical link control (LLC) layer 12 and a media access control (MAC) layer 14. The LLC layer 12 addresses and exchanges data with a network layer 16. The MAC layer 14 provides an interface between the LLC layer 12 and a physical layer 18.

The MAC layer 14 frames data for transmission over the network and then passes the frame to the physical layer 18 for transmission as a stream of bits. In other words, the MAC layer 14 frames data into distinct units or packets that are transmitted one at a time over the network.

The physical layer 18 typically includes a physical coding sublayer (PCS) 20, a physical medium attachment (PMA) sublayer 22, and an autonegotiation sublayer 24. A medium dependent interface (MDI) 26 such as an RJ-45 connector connects the physical layer 18 to media 28 such as twisted pair wires, optical fiber or other media. The IEEE 802.3 specification, which is hereby incorporated by reference, further defines how physical network interfaces operate with different types of media such as coaxial cable, twisted-pair cable and optical fiber.

To improve flexibility, the physical layer 18 of some network devices has been designed to be connected to different types of media. The manufacturer and/or the user may not know the type of media that will be used at the time of manufacturing or purchase. The type of media that is used may also change over time.

For example, the physical layer 18 is selectively connectable to copper or optical fiber. Currently, the PCS sublayer 20 of the physical layer 18 is programmed to handle the specific type of media that will be used. For example when optical fiber is used, the operating mode of the PCS 20 is programmed to provide an optical interface. If the user later decides to use a different type of media such as copper, the operating mode of the PCS 20 is programmed to provide a copper interface. The reprogramming process increases the cost of operating the network.

The autonegotiation sublayer 24 initiates the exchange of information between two connected network devices and automatically configures the devices to take maximum advantage of their respective abilities. The autonegotiation sublayer 24 advertises the abilities of the network device, acknowledges receipt, identifies common modes of operation, and rejects the use of operational modes that are not shared or supported by both devices. When more than one common mode of operation exists between the devices, an arbitration function of the autonegotiation layer 24 identifies and selects a single mode of operation. After autonegotiation is complete, the devices establish a link and exchange data.

SUMMARY OF THE INVENTION

A network device and method of operating a network device according to the invention includes a media access controller (MAC) and a physical layer. The physical layer includes an interface that communicates with the MAC. A first autonegotiation circuit attempts to establish a first link using a first transceiver over a first media. A second autonegotiation circuit attempts to establish a second link using a second transceiver over a second media. A media selector communicates with the interface and the first and second autonegotiation circuits. The media selector enables data flow from the first media to the MAC using the interface when the link over the first media is established first.

In other features of the invention, the media selector powers down the second autonegotiation circuit and/or the second transceiver when the first link over the first media is established first. The media selector powers up the second autonegotiation circuit and/or the second transceiver when the first link is lost.

In still other features, the media selector enables data flow from the second media to the MAC using the interface when the second link over the second media is established first. The media selector powers down the first autonegotiation circuit and/or the first transceiver when the second link over the second media is established first. The media selector powers up the first autonegotiation circuit and/or the first transceiver when the second link is lost.

In still other features, the media selector enables data flow from the first media to the MAC using the interface when the first and second links over the first and second media are established at the same time. The media selector powers down the second autonegotiation circuit and/or the second transceiver when the first and second links over the first and second media are established at the same time. The media selector powers up the second autonegotiation circuit and/or the second transceiver when the first link over the first media is lost.

In yet other features, the first media is copper and the second media is optical fiber. The interface is a physical coding sublayer (PCS) circuit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
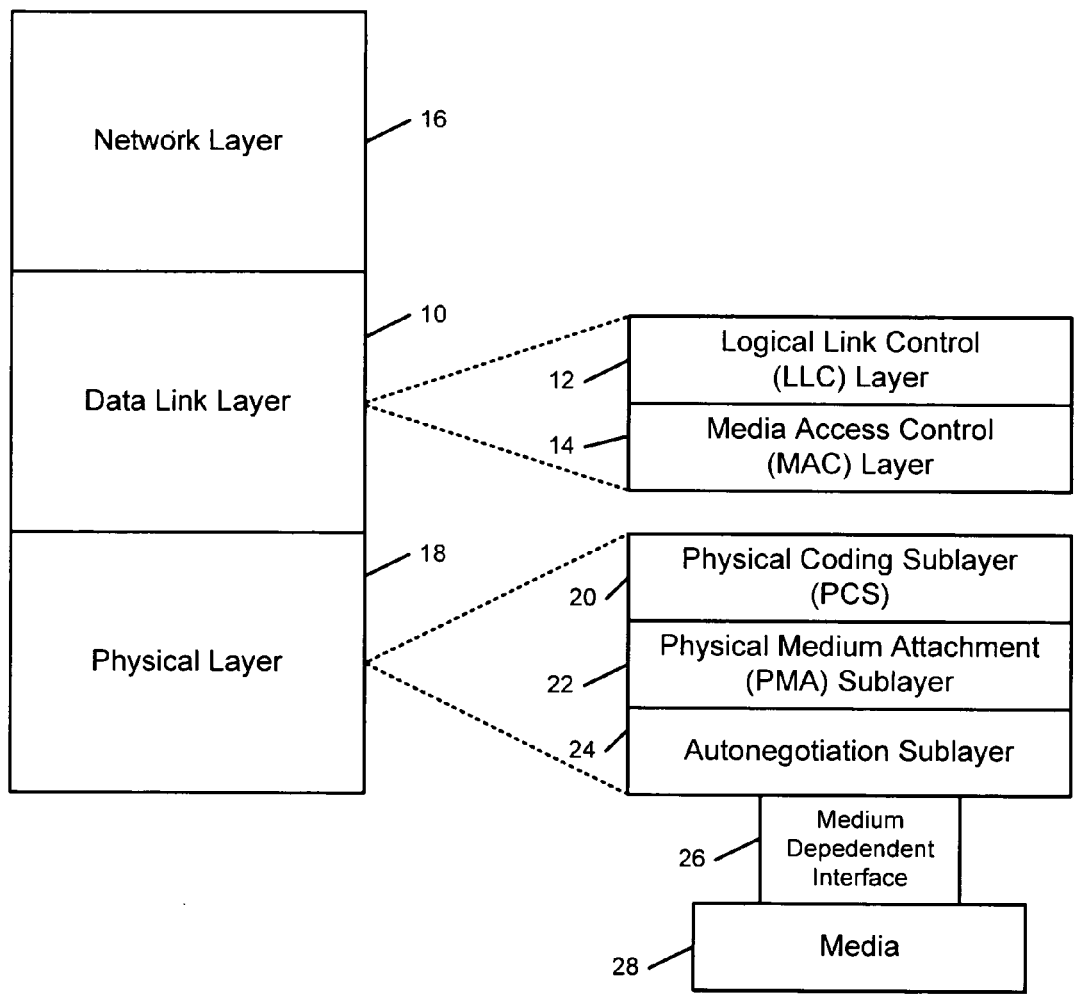
FIG. 1 is a partial OSI network model for communication between network devices according to the prior art.
Figure 2:
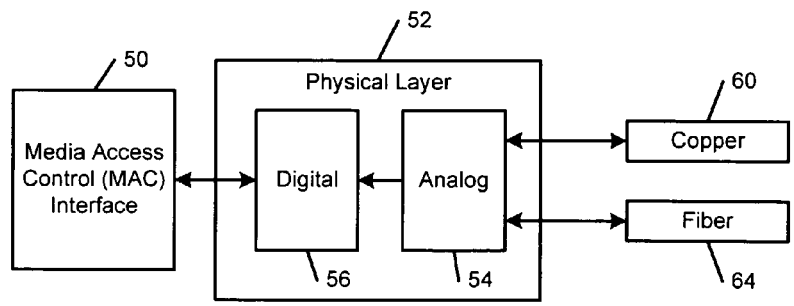
FIG. 2 is a functional block diagram of a network device including a media access control (MAC) layer and a physical layer with an automatic media selector according to the present invention.

Referring now to FIG. 2, a media access control (MAC) layer 50 communicates with a physical layer 52 of a network device. The physical layer 52 includes analog and digital circuits 54 and 56. In the exemplary embodiment, the analog circuits 54 are physically connected to copper media 60 and/or fiber media 64 using media dependent interfaces (MDI) (not shown in FIG. 2) such as an RJ-45 connector or a fiber connector. Skilled artisans can appreciate that the present invention applies to other types of media such as radio frequency as well.

In use, the digital circuits 56 of the physical layer 52 include a physical coding sublayer (PCS) interface. Both the copper and fiber autonegotiation sublayers attempt to initiate a link over the copper and fiber media 60 and 64, respectively. If autonegotiation is completed over the fiber media, the PCS interface is configured for fiber. The copper autonegotiation sublayer and the copper transceiver are preferably powered down. Data flow from the fiber media 64 to the MAC layer 50 is enabled. When the link over the fiber media 64 goes down, the copper autonegotiation layer and/or the copper transceiver are powered back up.

Alternately, if autonegotiation and a link are completed over the copper media before or at the same time as the fiber media, the PCS interface is configured for copper. The fiber autonegotiation sublayer and the fiber transceiver are preferably powered down. Data flow from the copper media 60 to the MAC layer 50 is enabled. When the link over the copper media 60 goes down, the fiber autonegotiation sublayer and the fiber transceiver are powered up. As a result, the physical layer 52 automatically configures itself without requiring the physical layer 52 (and/or the PCS thereof) to be reprogrammed.

Skilled artisans can appreciate that a standard interface may be provided between the MAC layer 50 and the physical layer 52. For example, the standard interface can be TBI, GMII, SGMI, RGI, RTBI, MII, RMII, SMII or other suitable interfaces.

Figure 3:
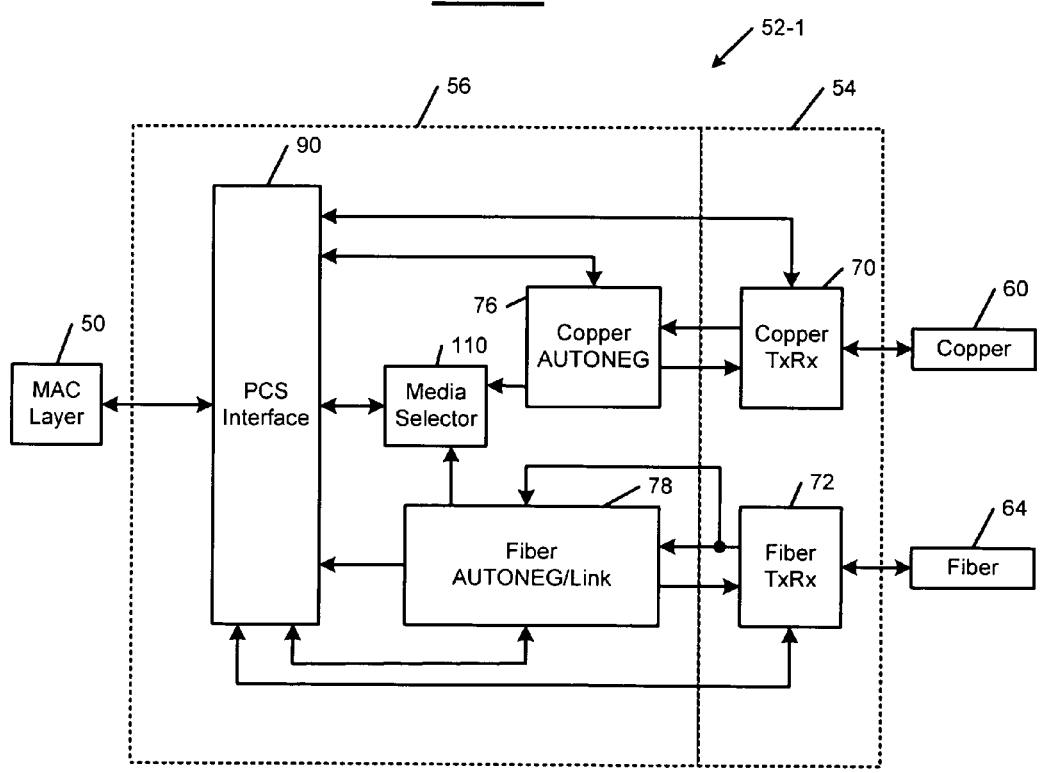
FIG. 3 is a more detailed functional block diagram of the a first exemplary physical layer including the automatic media selector of FIG. 2.

Referring now to FIG. 3, the analog circuits 54 of a first exemplary physical layer 52-1 are shown in further detail and include a copper transceiver 70 and a fiber transceiver 72. The digital circuits 56 of the physical layer 52-1 are also shown in further detail and include a copper autonegotiation circuit 76 and a fiber autonegotiation/link circuit 78 that are connected to the copper transceiver 70 and fiber transceiver 72, respectively. A physical coding sublayer (PCS) interface 90 communicates with the copper transceiver 70, the copper autonegotiation circuit 76, the link circuit 80, the fiber autonegotiation/link circuit 78 and/or the fiber transceiver 72. The PCS interface 90 has first and second modes of operation for copper and optical fiber, respectively, that can be selected by an automatic media selector 110 as will be described more fully below.

During copper autonegotiation, the copper transceiver 70 transmits Fast Link Pulse (FLP) bursts over the copper 60. The FLP pulse bursts contain configuration parameters that the first network device wishes to advertise. If the copper transceiver 70 receives FLP bursts, negotiation of the configuration parameters occurs and a link over the copper 60 is established and data is exchanged.

During fiber autonegotiation, code groups are initially transmitted by the fiber transceiver 72. For example code groups such as KDKD . . . are transmitted where each symbol represents multiple bits. When autonegotiation occurs, code groups such as KDCCKDCC . . . are transmitted. The link circuit 80 monitors the code groups and identifies sync status. When autonegotiation completes, a link over fiber 64 is established and data is exchanged.

The media selector 110 communicates with the copper autonegotiation circuit 76, the link circuit 80, and/or the PCS interface 90. The media selector 110 monitors the status of the copper autonegotiation circuit 76 and the link circuit 80 to identify the media that establishes a link first. Once the link is established over one media, the autonegotiation circuit and/or the transceiver associated with the other media are powered down until the link goes down. When this occurs, the autonegotiation circuit and/or the transceiver that is associated with the other media is powered back up.

Figure 4:
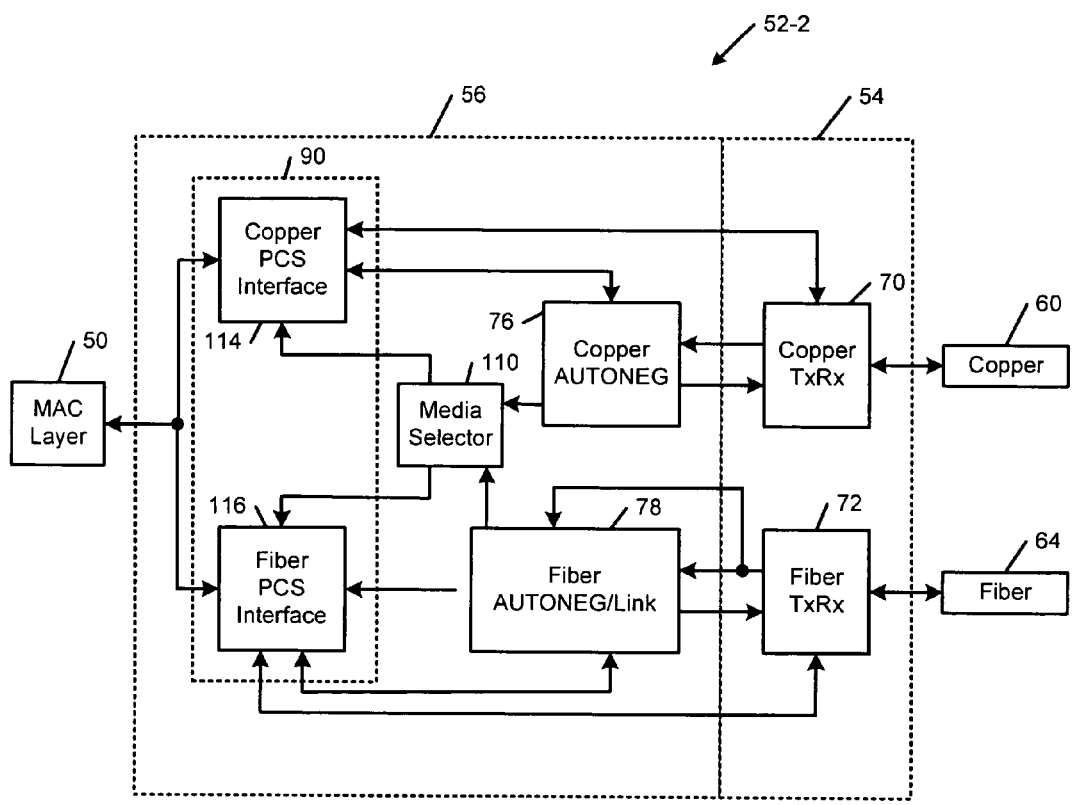
FIG. 4 is a more detailed functional block diagram of the a second exemplary physical layer including the automatic media selector of FIG. 2.

Referring now to FIG. 4, reference numbers from FIG. 3 are used in FIG. 4 where appropriate to identify the same elements. A second exemplary physical layer 52-2 is shown. The PCS interface 90 may include a copper interface 114 and an optical fiber interface 116. As described above, the automatic media selector 110 selects one of the interfaces 114 and 116 depending upon which media completes a link first. The other interface is preferably disabled and/or powered down until the link goes down. Otherwise, the operation for the physical layer 52-2 is similar to the physical layer 52-1.

Figure 5:
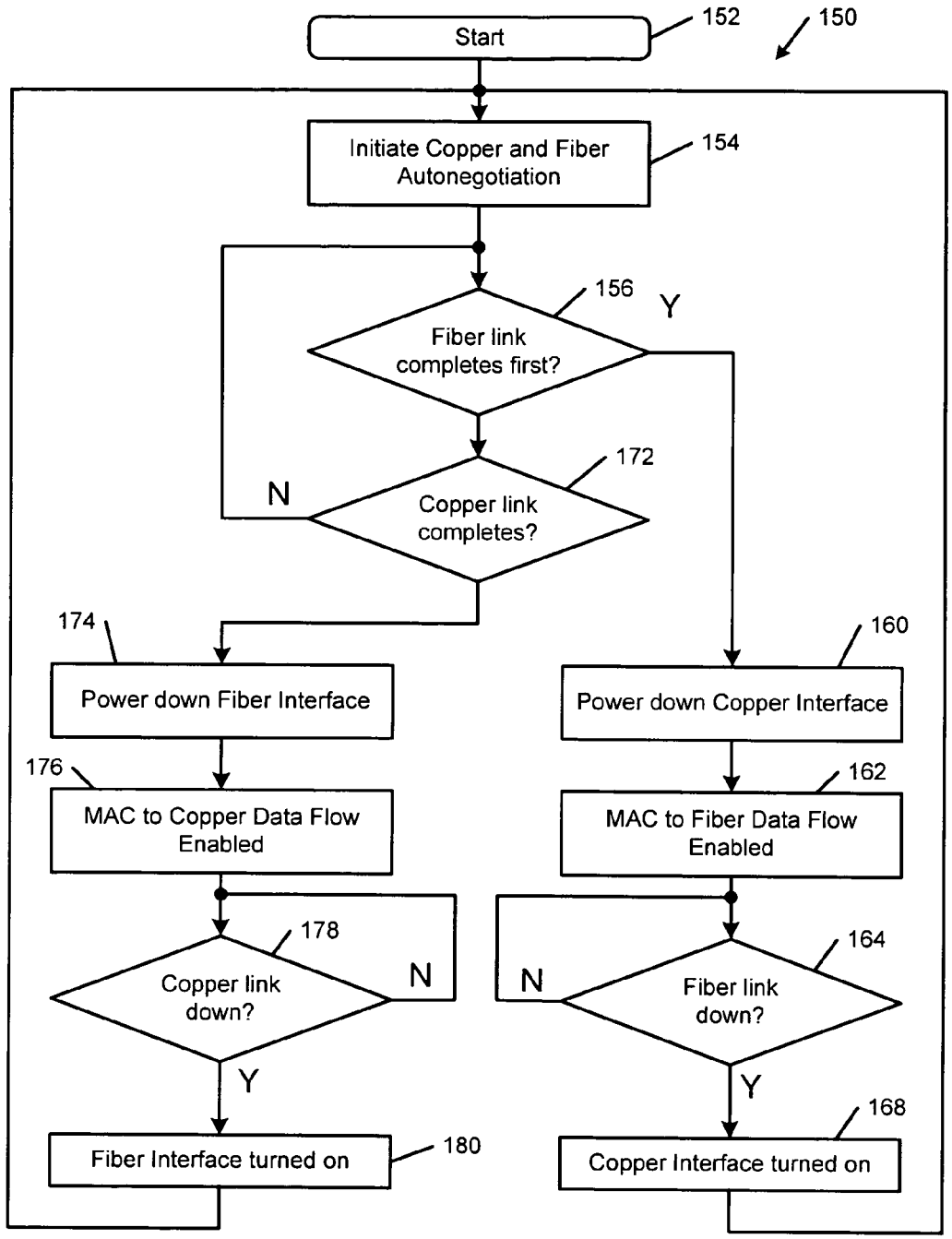
FIG. 5 illustrates steps performed by the automatic media selector of FIGS. 3 and 4.

Referring now to FIG. 5, steps for performing automatic media selection according to the present invention are shown generally at 150. Control begins with step 152 and proceeds to step 154. In step 154, both copper and fiber autonegotiation are initiated. In step 156, the media selector 110 determines whether a fiber link has completed. If the fiber link has completed, the media selector 110 powers down the copper interface 114, the copper autonegotiation circuit 76 and/or the copper transceiver 70 in step 160. In step 162, the media selector 110 enables data flow over fiber to the MAC layer 50. In step 164, the media selector 110 determines whether the fiber link is down. If not, control loops back to step 164. Otherwise, control continues with step 168 where the circuits that were powered down in step 160 are powered back up. Control continues from step 168 back to step 154.

If the fiber link does not complete first as determined in step 156, control continues with step 172. In step 172, control determines whether a copper link is established. If the copper link occurs, the media selector 110 powers down the fiber PCS interface 116, the link circuit 80, the fiber autonegotiation/link circuit 78 and/or the fiber transceiver 72 in step 174. In step 176, the media selector 110 enables data flow over copper to the MAC layer 50. In step 178, the media selector 110 determines whether the copper link is down. If not, control loops back to step 178. Otherwise, control continues with step 180 where the circuits that were powered down in step 174 are powered back up. Control continues from step 180 to step 154.

The copper interface is employed as a default when both copper and fiber complete the link at the same time. Alternatively, skilled artisans can appreciate that fiber can be selected as a default when both copper and fiber complete the link at the same time. However, both copper and fiber will rarely complete the link at the same time. As can be appreciated, the physical layer can be implemented in a variety of ways such as analog and/or digital circuits, software executed by a processor and memory, application specific integrated circuits, or in any other suitable manner.

Thus it will be appreciated from the above, the present invention discloses an automatic media selector and method for selecting the media for Ethernet transceivers. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A network device comprising:
a media access controller (MAC); and
a physical layer including an interface that communicates with said MAC, first and second transceivers, a first autonegotiation circuit that attempts to establish a first link using said first transceiver over a first media, a second autonegotiation circuit that attempts to establish a second link using said second transceiver over a second media, and a media selector that communicates with said interface and said first and second autonegotiation circuits and that enables data flow from said first media to said MAC using said interface when said link over said first media is established first.

2. The network device of claim 1 wherein said media selector powers down at least one of said second autonegotiation circuit and said second transceiver when said first link over said first media is established first.

3. The network device of claim 2 wherein said media selector powers up said at least one of said second autonegotiation circuit and said second transceiver when said first link is lost.

4. The network device of claim 1 wherein said media selector enables data flow from said second media to said MAC using said interface when said second link over said second media is established first.

5. The network device of claim 4 wherein said media selector powers down at least one of said first autonegotiation circuit and said first transceiver when said second link over said second media is established first.

6. The network device of claim 5 wherein said media selector powers up said at least one of said first autonegotiation circuit and said first transceiver when said second link is lost.

7. The network device of claim 1 wherein said first media is copper and said second media is optical fiber.

8. The network device of claim 1 further comprising a status indicator that identifies the link that was established first.

9. A network device comprising:
a media access controller (MAC); and a physical layer including
a first interface that communicates with said MAC,
first and second transceivers,
a first autonegotiation circuit that attempts to establish a first link using said first transceiver over a first media,
a second interface that communicates with said MAC,
a second autonegotiation circuit that attempts to establish a second link using said second transceiver over a second media, and
a media selector that communicates with said first and second interfaces and said first and second autonegotiation circuits and that enables data flow from said first media to said MAC using said first interface when said link over said first media is established first.

10. The network device of claim 9 wherein said media selector disables said second interface and powers down at least one of said second autonegotiation circuit and said second transceiver when said first link over said first media is established first.

11. The network device of claim 10 wherein said media selector enables said second interface and powers up said at least one of said second autonegotiation circuit and said second transceiver when said first link is lost.

12. The network device of claim 9 wherein said media selector enables data flow from said second media to said MAC using said second interface when said second link over said second media is established first.

13. The network device of claim 12 wherein said media selector disables said first interface and powers down at least one of said first autonegotiation circuit and said first transceiver when said second link over said second media is established first.

14. The network device of claim 13 wherein said media selector enables said first interface and powers up said at least one of said first autonegotiation circuit and said first transceiver when said second link is lost.

15. The network device of claim 9 wherein said first media is copper and said second media is optical fiber.

16. The network device of claim 9 further comprising a status indicator that identifies the link that was established first.

17. A network device comprising:
a media access controller (MAC); and
a physical layer including
interface means for communicating with said MAC,
first and second transceivers,
first autonegotiation means for attempting to establish a first link using said first transceiver over a first media,
second autonegotiation means for attempting to establish a second link using said second transceiver over a second media, and
media selection means for communicating with said interface means and said first and second autonegotiation means and for enabling data flow from said first media to said MAC using said interface means when said link over said first media is established first.

18. The network device of claim 17 wherein said media selection means powers down at least one of said second autonegotiation means and said second transceiver when said first link over said first media is established first.

19. The network device of claim 18 wherein said media selection means powers up said at least one of said second autonegotiation means and said second transceiver when said first link is lost.

20. The network device of claim 17 wherein said media selection means enables data flow from said second media to said MAC using said interface means when said second link over said second media is established first.

21. The network device of claim 20 wherein said media selection means powers down at least one of said first autonegotiation means and said first transceiver when said second link over said second media is established first.

22. The network device of claim 21 wherein said media selection means powers up said at least one of said first autonegotiation means and said first transceiver when said second link is lost.

23. The network device of claim 17 wherein said first media is copper and said second media is optical fiber.

24. The network device of claim 17 further comprising status indicating means for identifying the link that was established first.

25. A method for operating a network device including a media access controller (MAC), comprising:
- attempting to autonegotiate a first link using a first transceiver over a first media;
- attempting to autonegotiate a second link using a second transceiver over a second media; and
- enabling data flow from said first media to said MAC when said link over said first media is established first.

26. The method of claim 25 further comprising powering down at least one of a second autonegotiation circuit and said second transceiver when said first link over said first media is established first.

27. The method of claim 26 further comprising powering up said at least one of said second autonegotiation circuit and said second transceiver when said first link is lost.

28. The method of claim 25 further comprising enabling data flow from said second media to said MAC when said second link over said second media is established first.

29. The method of claim 28 further comprising powering down at least one of a first autonegotiation circuit and said first transceiver when said second link over said second media is established first.

30. The method of claim 29 further comprising powering up said at least one of said first autonegotiation circuit and said first transceiver when said second link is lost.

31. The method of claim 25 wherein said first media is copper and said second media is optical fiber.

32. The method of claim 25 further comprising generating a status signal based on the link that was established first.

* * * * *